(12) United States Patent
Kobayashi (10) Patent No.: US 11,092,552 B2
(45) Date of Patent: Aug. 17, 2021

(54) FLAME ATOMIC ABSORPTION SPECTROPHOTOMETER

(71) Applicant: Shimadzu Corporation, Kyoto (JP)

(72) Inventor: Osuke Kobayashi, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 16/627,169

(22) PCT Filed: Jul. 10, 2017

(86) PCT No.: PCT/JP2017/025138
§ 371 (c)(1),
(2) Date: Dec. 27, 2019

(87) PCT Pub. No.: WO2019/012580
PCT Pub. Date: Jan. 17, 2019

(65) Prior Publication Data
US 2020/0158648 A1    May 21, 2020

(51) Int. Cl.
  *G01N 21/31* (2006.01)
  *G01N 21/71* (2006.01)
(52) U.S. Cl.
  CPC ....... *G01N 21/714* (2013.01); *G01N 21/3103* (2013.01)
(58) Field of Classification Search
  CPC ........... G01N 21/3101; G01N 21/3103; G01N 21/714; G01N 21/27; G01N 21/72; G01N 21/274; G01N 21/31; G01J 3/42; G01J 3/28
  USPC ....... 356/315, 311, 330, 301, 319, 317, 325, 356/432–440; 431/79, 4, 14, 89
  See application file for complete search history.

(56) References Cited

U.S. PATENT DOCUMENTS 3,600,571 A * 8/1971 Chisholm .......... G01N 21/3103
                                                          362/232
4,314,764 A * 2/1982 Liddell ................. G01N 21/72
                                                          356/315
(Continued)

FOREIGN PATENT DOCUMENTS

JP         53-114285     2/1978
JP         H06-18285 A   1/1994
(Continued)

OTHER PUBLICATIONS

Written Opinion of the International Searching Authority for PCT application No. PCT/JP2017/025138, submitted with a machine translation.

*Primary Examiner* — Hoa Q Pham
(74) *Attorney, Agent, or Firm* — Muir Patent Law, PLLC (57) ABSTRACT

A flame atomic absorption spectrophotometer in which an angle of a burner can be manually adjusted and a rotation position of the burner can be easily obtained is provided. An atomization unit burns mixed gas of fuel gas and supporting gas with a burner to form flame, and atomizes a sample by spraying the sample into the flame. A light source emits a measuring beam into the flame. A detector detects the measuring beam that has passed through the flame. A manual rotation mechanism allows the burner to be manually rotated to change an angle of the burner with respect to an optical path of the measuring beam. A rotation position detection unit detects a rotation position of the burner.

7 Claims, 8 Drawing Sheets

(56) References Cited

U.S. PATENT DOCUMENTS

| | | | | |
|---|---|---|---|---|
| 4,776,694 A | * | 10/1988 | Rogasch | G01N 21/72 |
| | | | | 356/315 |
| 5,272,335 A | | 12/1993 | Nakaho | |
| 5,311,277 A | * | 5/1994 | Sasaki | G01N 21/3103 |
| | | | | 356/312 |
| 5,754,335 A | | 5/1998 | Takagi et al. | |
| 6,493,081 B1 | * | 12/2002 | Nishigaki | F23N 5/082 |
| | | | | 356/315 |
| 2015/0293014 A1 | * | 10/2015 | Sugihara | G01N 21/3103 |
| | | | | 356/311 |
| 2019/0056361 A1 | | 2/2019 | Ono | |
| 2020/0225148 A1 | * | 7/2020 | Sugihara | G01J 3/42 |

FOREIGN PATENT DOCUMENTS

| | | | |
|---|---|---|---|
| JP | H0711484 B2 | | 2/1995 |
| JP | H09-304270 A | | 11/1997 |
| JP | 2001153799 A | * | 6/2001 |
| JP | 2011227054 A | | 11/2011 |
| WO | 2017098661 A1 | | 6/2017 |

\* cited by examiner

FLAME ATOMIC ABSORPTION SPECTROPHOTOMETER

TECHNICAL FIELD

The present invention relates to a flame atomic absorption spectrophotometer for forming flame by burning mixed gas of fuel gas and supporting gas with a burner and measuring atomic absorption of a sample atomized by spraying the sample into the flame.

BACKGROUND ART

As an example of an atomic absorption spectrophotometer, a flame atomic absorption spectrophotometer is known. In this type of atomic absorption spectrophotometer, a flame is formed by burning mixed gas of fuel gas and supporting gas with a burner. Then, the sample is sprayed into the flame to atomize the sample, so that the atomic absorption of the atomized sample can be measured.

In atomic absorption measurement, a calibration curve representing a relationship between a concentration of a sample and an absorbance is used. The calibration curve has a characteristic that the linearity is high in a range where the concentration of a sample is low, while the linearity is low in a range where the concentration of a sample is high, and the measurement accuracy is lowered. For this reason, in a case where the concentration of a sample is high, optical absorption sensitivity is generally lowered by adjusting an angle of the burner (see, for example, Patent Document 1 below).

PRIOR ART DOCUMENTS

Patent Documents

Patent Document 1: Japanese Patent Publication No. 7-11484

SUMMARY OF THE INVENTION

Problems to be Solved by the Invention

In a case where an angle of a burner is adjusted to perform sensitivity adjustment as described above, a measurement result and the angle of a burner are desirably stored in association with each other from the viewpoint of traceability of the measurement result. In a case of a configuration in which the angle of a burner is adjusted with a motor as in Patent Document 1 above, the angle of the burner can be easily obtained from a rotation angle of the motor, and the angle of the burner can be stored in association with a measurement result.

However, in the configuration in which the angle of the burner is adjusted with the motor, the mechanism is complicated and a failure of the motor and the like may occur. Further, as the burner needs to be replaced according to a type of supporting gas to be used, the replacement work becomes complicated due to the presence of a drive mechanism, such as the motor. In view of the above, it is conceivable to manually adjust the angle of the burner. In this case, however, there is a problem that the angle of the burner cannot be obtained from the rotation angle of the motor.

The present invention has been made in view of the above circumstances, and an object of the present invention is to provide a flame atomic absorption spectrophotometer, in which an angle of a burner can be manually adjusted and a rotation position of the burner can be easily obtained. Further, an object of the present invention is to provide a flame atomic absorption spectrophotometer that can ensure traceability of a measurement result while employing a configuration in which an angle of a burner is manually adjusted.

Means for Solving the Problems (1) A flame atomic absorption spectrophotometer according to the present invention includes an atomization unit, a light source, a detector, a manual rotation mechanism, and a rotation position detection unit. The atomization unit burns mixed gas of fuel gas and supporting gas with a burner to form flame, and atomizes a sample by spraying the sample into the flame. The light source emits a measuring beam into the flame. The detector detects the measuring beam that has passed through the flame. The manual rotation mechanism allows the burner to be manually rotated to change an angle of the burner with respect to an optical path of the measuring beam. The rotation position detection unit detects a rotation position of the burner.

According to such a configuration, an angle of the burner can be manually adjusted by the manual rotation mechanism. Further, since the rotation position of the burner can be detected by the rotation position detection unit, the rotation position of the burner can be easily obtained. Furthermore, a relationship between the rotation position of the burner detected by the rotation position detection unit and a measurement result can be associated, so that the traceability of the measurement result can be ensured.

(2) The rotation position detection unit may discretely detect the rotation position of the burner.

According to such a configuration, the rotation position of the burner can be detected discretely, and a relationship between each rotation position and a measurement result can be associated. Therefore, the traceability of the measurement result at each rotation position detected by the rotation position detection unit can be ensured.

(3) The rotation position detection unit may continuously detect the rotation position of the burner.

According to such a configuration, the rotation position of the burner can be detected continuously, and a relationship between each of continuous rotation positions and a measurement result can be associated. Therefore, the traceability of the measurement result can be further improved.

(4) The flame atomic absorption spectrophotometer may further include a storage unit that stores, as a device condition, a rotation position of the burner detected by the rotation position detection unit.

According to such a configuration, the rotation position of the burner is stored in the storage unit as a device condition. Therefore, when a measurement result is checked, the rotation position of the burner can be read from the storage unit and checked as part of the device condition. Therefore, the traceability of the measurement result can be further improved.

(5) In association with calibration curve data obtained by measuring a known sample, the storage unit may store, as a device condition, a rotation position of the burner when the calibration curve data is obtained.

According to such a configuration, the rotation position of the burner when the calibration curve data is obtained can be read from the storage unit and checked as part of the device condition, so that the traceability of the measurement result can be further improved.

(6) The flame atomic absorption spectrophotometer may further include a sample concentration calculation unit. The sample concentration calculation unit calculates a concentration of a sample based on measurement data obtained by measuring an unknown sample and calibration curve data obtained under the same device conditions as the measurement. In this case, in a manner associated with the concentration of the sample calculated by the sample concentration calculation unit and the calibration curve data used when the concentration of the sample is calculated, the rotation position of the burner when the calibration curve data is obtained may be stored in the storage unit as the device condition.

According to such a configuration, when the concentration of the sample calculated based on the measurement data of the unknown sample and the calibration curve data is checked as the measurement result, the rotation position of the burner when the calibration curve data used when the concentration of the sample is calculated is obtained can be read from the storage unit and checked as part of the device conditions.

(7) The flame atomic absorption spectrophotometer may further include a data output unit. The data output unit outputs, as report data, the concentration of the sample calculated by the sample concentration calculation unit, calibration curve data used when the concentration of the sample is calculated, and a device condition including a rotation position of the burner when the calibration curve data is obtained.

According to such a configuration, when the concentration of the sample calculated based on the measurement data of the unknown sample and the calibration curve data is checked as the measurement result on the report data, the calibration curve data used when the concentration of the sample is calculated and the rotation position of the burner when the calibration curve data is obtained can be checked as part of the device conditions.

Effects of the Invention

According to the present invention, an angle of a burner can be manually adjusted by a manual rotation mechanism, and a rotation position of the burner can be easily obtained by a rotation position detection unit. Further, according to the present invention, a relationship between a rotation position of the burner detected by the rotation position detection unit and a measurement result can be associated, so that the traceability of the measurement result can be ensured.

MODE FOR CARRYING OUT THE INVENTION

1. Overall Configuration of Atomic Absorption Spectrophotometer

Figure 1:
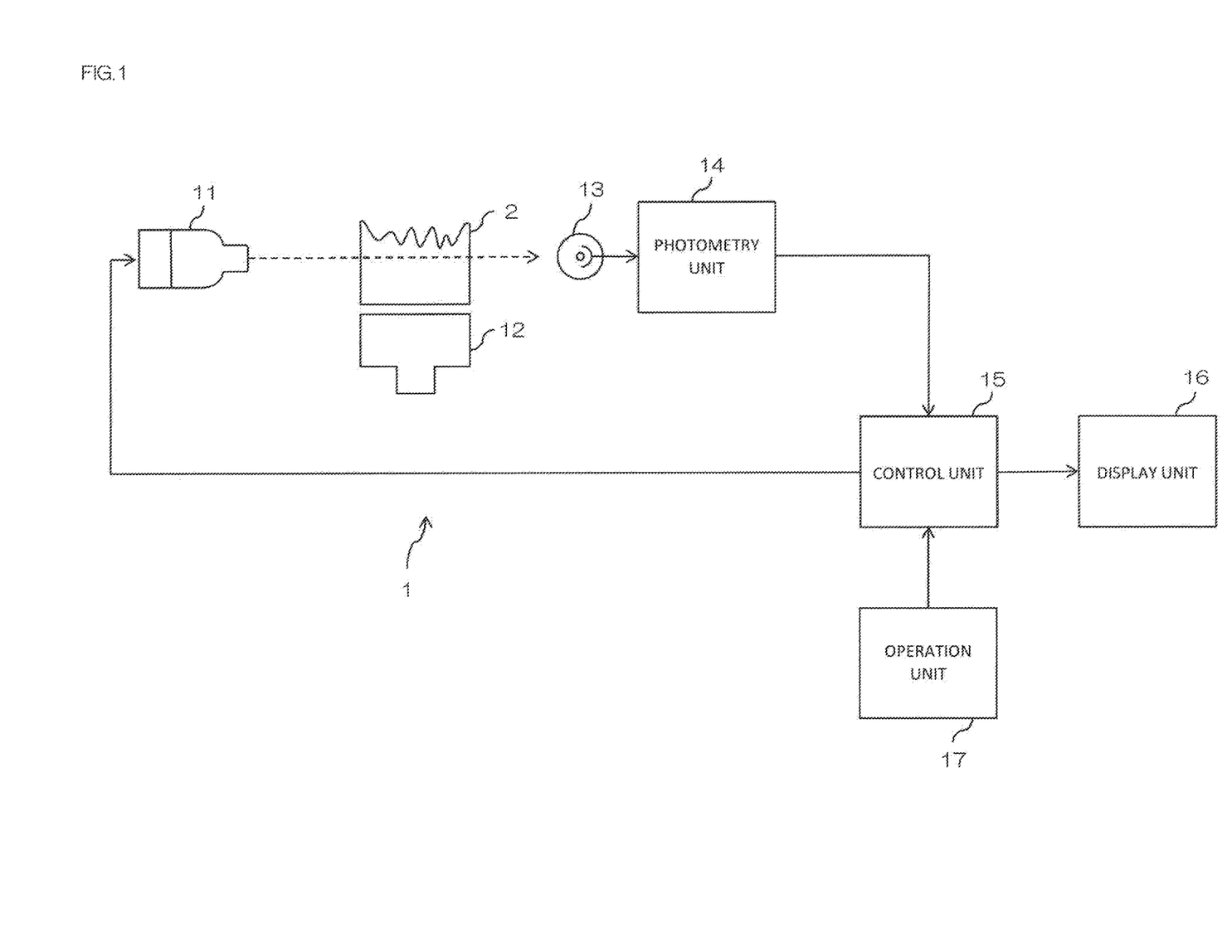
FIG. 1 is a schematic diagram showing a configuration example of an atomic absorption spectrophotometer according to an embodiment of the present invention.

FIG. 1 is a schematic diagram showing a configuration example of an atomic absorption spectrophotometer 1 according to an embodiment of the present invention. The atomic absorption spectrophotometer 1 is a flame atomic absorption spectrophotometer for forming flame 2 by burning mixed gas of fuel gas and supporting gas and measuring atomic absorption of a sample atomized by spraying the sample into the flame 2.

The atomic absorption spectrophotometer 1 includes a light source 11, an atomization unit 12, a detector 13, a photometry unit 14, a control unit 15, a display unit 16, an operation unit 17, and the like. In FIG. 1, a solid arrow represents flow of a signal, and a broken arrow represents flow of a measuring beam.

The light source 11 is composed of, for example, a hollow-cathode lamp. Light emitted from the light source 11 is a measuring beam including a bright line spectrum and is applied to the flame 2. The measuring beam applied to the flame 2 has a specific wavelength absorbed by a component of an atomized sample included in the flame 2. The measuring beam having the specific wavelength absorbed in the above manner passes through the flame 2 and then is detected by the detector 13.

The atomization unit 12 is supplied with fuel gas, supporting gas, and a sample. As the fuel gas, for example, acetylene gas ($C_2H_2$) can be used. Further, as the supporting gas, for example, air or nitrous oxide gas ($N_2O$) can be used. However, the fuel gas and the supporting gas are not limited to the above gas.

In the atomization unit 12, the fuel gas and the supporting gas are mixed to generate mixed gas, and the mixed gas is burned, so that the flame 2 is continuously formed during analysis. Further, the sample is atomized and then mixed with the mixed gas, and is supplied into the flame 2 together with the mixed gas. In this manner, the sample is sprayed into the flame 2, and the sample is atomized by heat of the flame 2.

The detector 13 is composed of, for example, a photomultiplier tube. The measuring beam that has passed through the flame 2 is detected by the detector 13, and an electric signal obtained according to light intensity by photoelectric conversion is output from the detector 13. The photometry unit 14 amplifies an output signal from the detector 13 and converts the signal into a digital signal by A/D conversion.

The control unit 15 performs processing of calculating a concentration of a component in the sample based on a signal input from the detector 13 via the photometry unit 14. Specifically, since a specific wavelength is absorbed by a component in the sample, a calibration curve representing the relationship between the concentration of the component in the sample and the absorbance is used to perform the calculation, so that the concentration of the component in the sample can be calculated.

The display unit 16 and the operation unit 17 are connected to the control unit 15. The display unit 16 is composed of, for example, a liquid crystal display, and displays a measurement result of the sample by the atomic absorption spectrophotometer 1 and the like. The operation unit 17 is composed of, for example, a keyboard and a mouse, and is operated by the user when setting a condition (device condition) of the device at the time of analysis.

2. Specific Configuration of Atomization Unit

Figure 2:
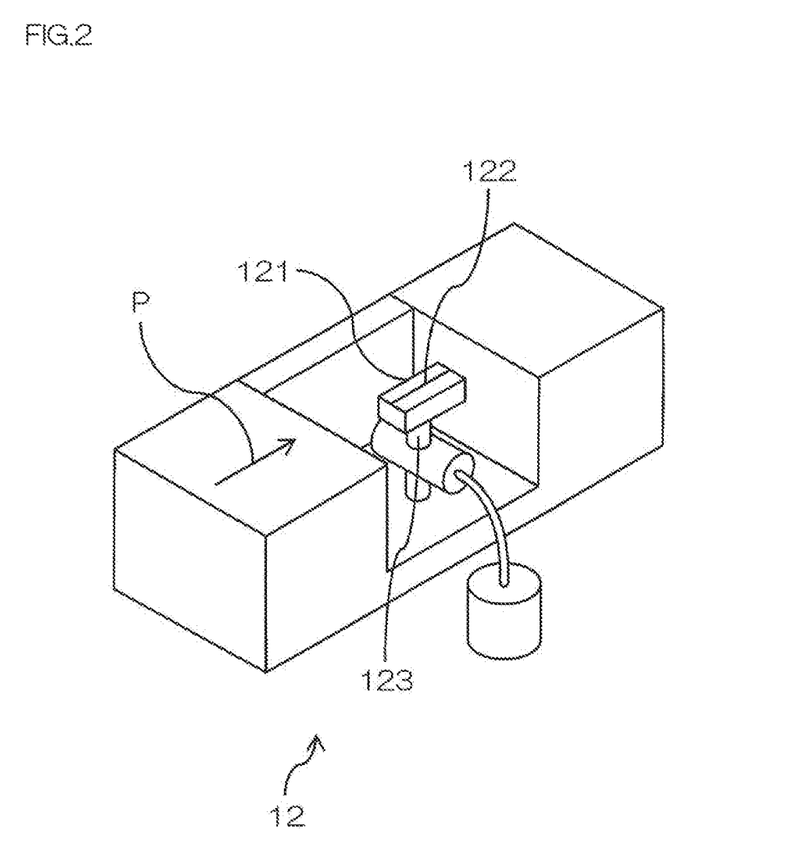
FIG. 2 is a perspective view showing a specific configuration of an atomization unit.

FIG. 2 is a perspective view showing a specific configuration of the atomization unit 12. The atomization unit 12 is provided with a burner 121 for burning mixed gas of fuel gas and supporting gas. The burner 121 is formed in a long shape, such as, for example, a rectangular parallelepiped, and is disposed so that a long direction of the burner 121 extends horizontally.

An outlet 122 extending in a straight line in the longitudinal direction is formed on an upper surface of the burner 121. At the time of analysis, mixed gas of fuel gas and supporting gas is continuously blown out from the outlet 122 and burned. In this manner, flame extending in a straight line along the outlet 122 is formed above the outlet 122.

A rotation shaft 123 extending in the vertical direction is provided on a lower surface of the burner 121. The burner 121 is rotatable in a horizontal plane around the rotation shaft 123. Therefore, by rotating the burner 121 around the rotation shaft 123, an angle of the outlet 122 can be manually adjusted.

In the state of FIG. 2, the outlet 122 extends along an optical path P of a measuring beam from the light source 11. In this state, the measuring beam from the light source 11 passes from one end to the other end through the flame formed above the outlet 122. For this reason, the absorbance for the measuring beam of a component of the atomized sample in the flame becomes high.

The calibration curve represents the relationship between the concentration of a component in the sample and the absorbance, and is represented by a straight line in which the higher the concentration, the higher the absorbance becomes. However, in a region where the concentration of a component in the sample is relatively high, the linearity of the calibration curve is deteriorated and the accuracy of the analysis is lowered. In view of the above, in a case where the concentration of a component in the sample is high, the burner 121 is rotated to change an angle of the flame to shorten a distance that the measuring beam passes through the flame. In this manner, since the absorbance is lowered and the concentration of a component in the sample can be calculated using a portion where the linearity is high in the calibration curve, the accuracy of the analysis is improved.

3. Rotation Mechanism of Burner

Figure 3A:
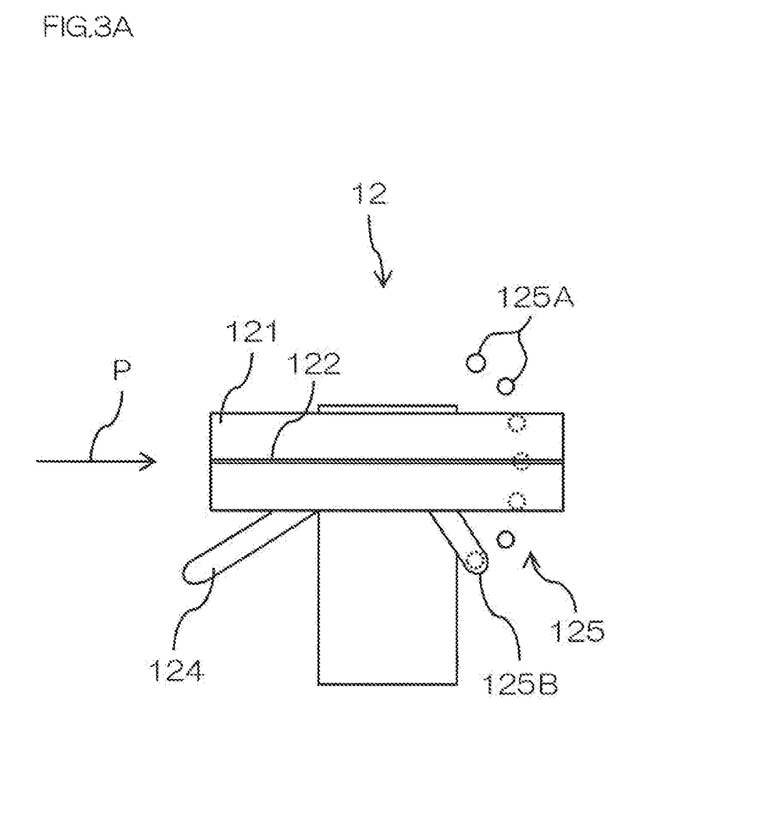
FIG. 3A is a plan view for explaining a rotation mechanism of a burner, and shows a state where an outlet of the burner is along an optical path of a measuring beam.
Figure 3B:
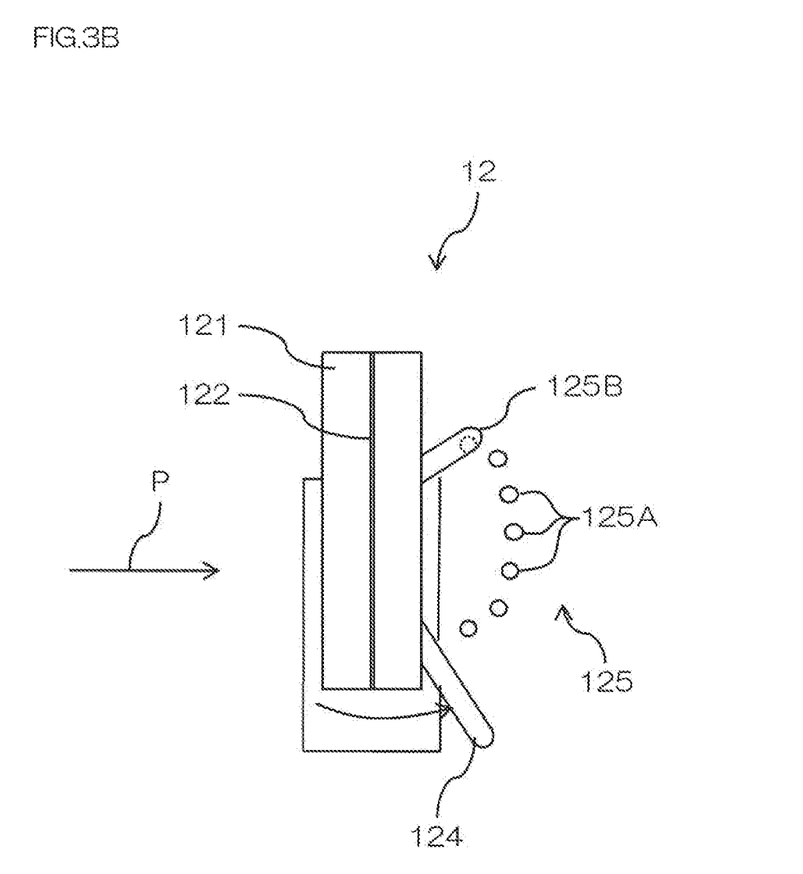
FIG. 3B is a plan view for explaining the rotation mechanism of the burner, and shows a state where the outlet of the burner is orthogonal to the optical path of the measuring beam.

FIGS. 3A and 3B are plan views for explaining a rotation mechanism of the burner 121. FIG. 3A shows a state where the outlet 122 of the burner 121 is along the optical path P of the measuring beam. On the other hand, FIG. 3B shows a state where the outlet 122 of the burner 121 is orthogonal to the optical path P of the measuring beam.

The burner 121 is provided with a grip portion 124. The user can rotate the burner 121 around the rotation shaft 123 by gripping the grip portion 124 and applying a force. That is, the rotation shaft 123 and the grip portion 124 constitute a manual rotation mechanism for manually rotating the burner 121. By this manual rotation mechanism, the angle of the burner 121 with respect to the optical path P of the measuring beam can be manually changed. Note that the grip portion 124 is omitted in FIG. 2.

Further, the atomization unit 12 is provided with a rotation position detection unit 125 that detects a rotation position of the burner 121. In this example, the rotation position detection unit 125 includes an optical sensor 125A and a light shielding unit 125B. The optical sensor 125A includes, for example, a light emitting unit and a light receiving unit (both not shown), and can detect a rotation position of the burner 121 based on whether or not light from the light emitting unit is received by the light receiving unit.

The light shielding unit 125B is provided in the burner 121, and rotationally moves around the rotation shaft 123 as the burner 121 rotates. A plurality of the optical sensors 125A are provided on a trajectory of the light shielding unit 125B that moves as the burner 121 rotates. Specifically, the plurality of the optical sensors 125A are disposed at equal intervals in the circumferential direction around the rotation shaft 123.

In this manner, light from the light emitting unit in any of the optical sensors 125 is shielded by the light shielding unit 125B according to the rotation position of the burner 121, and the light from the light emitting unit is not received by the light receiving unit. Therefore, the rotation position of the burner 121 can be detected discretely (intermittently) based on a light receiving amount of each of the optical sensors 125A. Note that the rotation position detection unit 125 is omitted in FIG. 2.

However, the rotation position detection unit 125 that performs detection discretely is not limited to an optical sensor, and may be composed of other various sensors, such as a capacitive sensor and a contact sensor like a limit switch.

4. Specific Configuration of Control Unit

Figure 4:
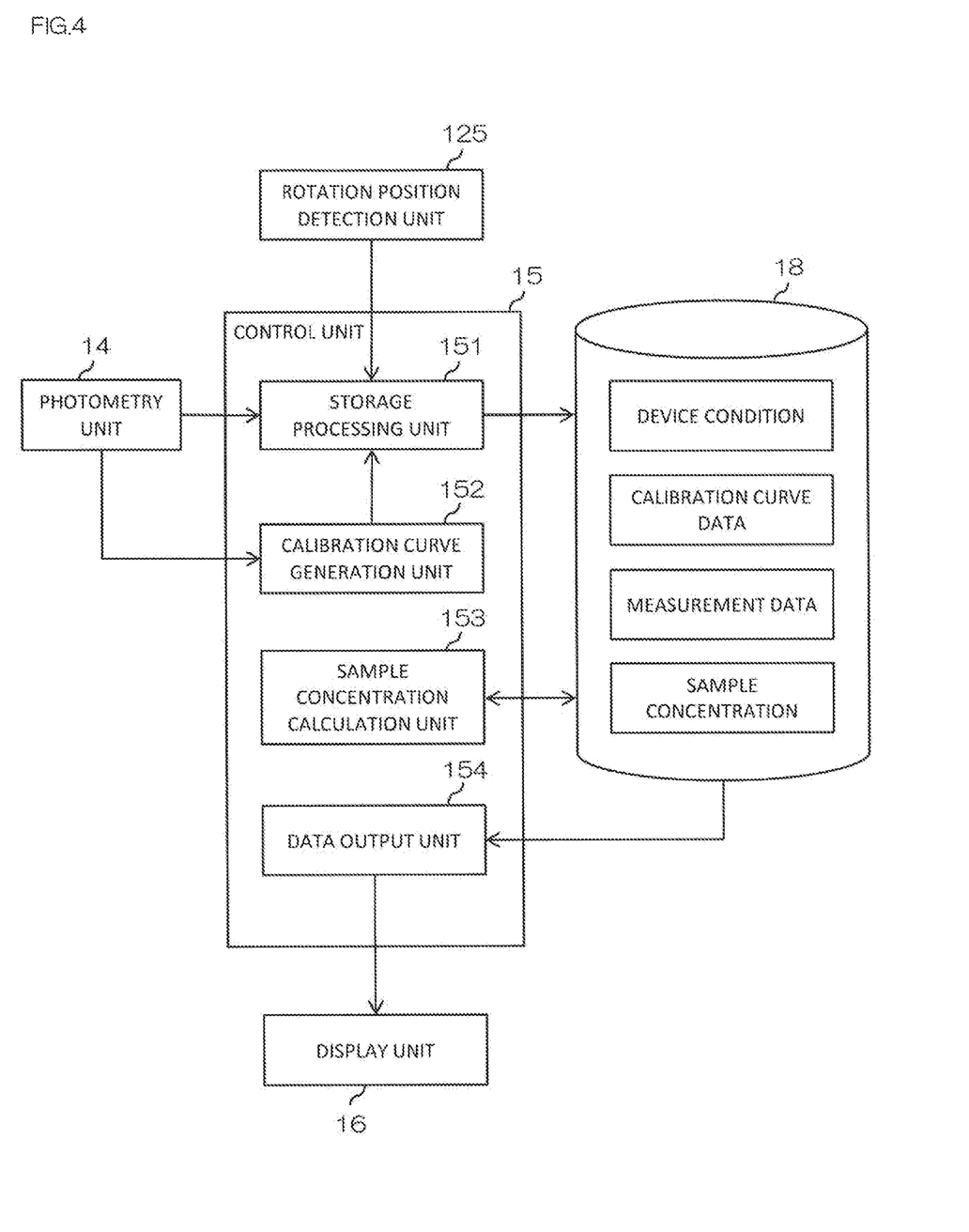
FIG. 4 is a block diagram showing a specific configuration of a control unit.

FIG. 4 is a block diagram showing a specific configuration of the control unit 15. The control unit 15 is configured to include, for example, a central processing unit (CPU). The control unit 15 functions as a storage processing unit 151, a calibration curve generation unit 152, a sample concentration calculation unit 153, a data output unit 154, and the like when the CPU executes a program. The control unit 15 can input and output data to and from a storage unit 18 composed of, for example, a hard disk or a random access memory (RAM).

The storage processing unit 151 performs processing for storing data in the storage unit 18 by outputting data to the storage unit 18. For example, in a case where a device condition is set by the user operating the operation unit 17, data of the device condition is stored in the storage unit 18 by the storage processing unit 151. The device conditions are setting conditions for a device at the time of analysis, and include the rotation position of the burner 121 as described above, as well as, for example, a flow rate of fuel gas and supporting gas, various setting conditions for the atomization unit 12, such as a height of the burner 121, and other various parameters.

The calibration curve generation unit 152 performs processing for generating a calibration curve based on measurement data input from the photometry unit 14 by measuring a sample (known sample) whose concentration of a contained component is known. Data of the calibration curve generated by the calibration curve generation unit 152 is stored in the storage unit 18 by the storage processing unit 151. At this time, the device conditions at the time of measuring the known sample (device conditions, such as the rotation position of the burner 121 when the calibration curve data is obtained) are stored in the storage unit 18 in association with the calibration curve data.

In a case where a sample (unknown sample) whose concentration of the contained component is unknown is measured, the storage processing unit 151 causes the storage unit 18 to store the measurement data input from the photometry unit 14. In this case as well, the device conditions at the time of measuring the unknown sample (device conditions, such as the rotation position of the burner 121 when the measurement data is obtained) are stored in the storage unit 18 in association with the measurement data.

The sample concentration calculation unit 153 calculates the concentration of a component contained in the unknown sample based on the measurement data obtained by measuring the unknown sample. Specifically, calibration curve data obtained under the same device conditions as when measuring an unknown sample is read from the storage unit 18, and the calibration curve data is compared with the measurement data of the unknown sample, so that the concentration of the sample is calculated.

The concentration of the sample calculated by the sample concentration calculation unit 153 is stored in the storage unit 18 as a measurement result. At this time, the calculated concentration of the sample is associated with the calibration curve data used when the concentration of the sample is calculated, and the device conditions, such as the rotation position of the burner 121 when the calibration curve data is obtained, and stored in the storage unit 18.

The data output unit 154 performs processing for outputting data stored in the storage unit 18. The data output from the data output unit 154 is displayed on the display unit 16 as report data representing the measurement result, and is checked by the user. However, the report data output from the data output unit 154 is not limited to be displayed on the display unit 16, and may be provided to the user by other methods, such as printing.

5. Specific Example of Report Data

Figure 5:
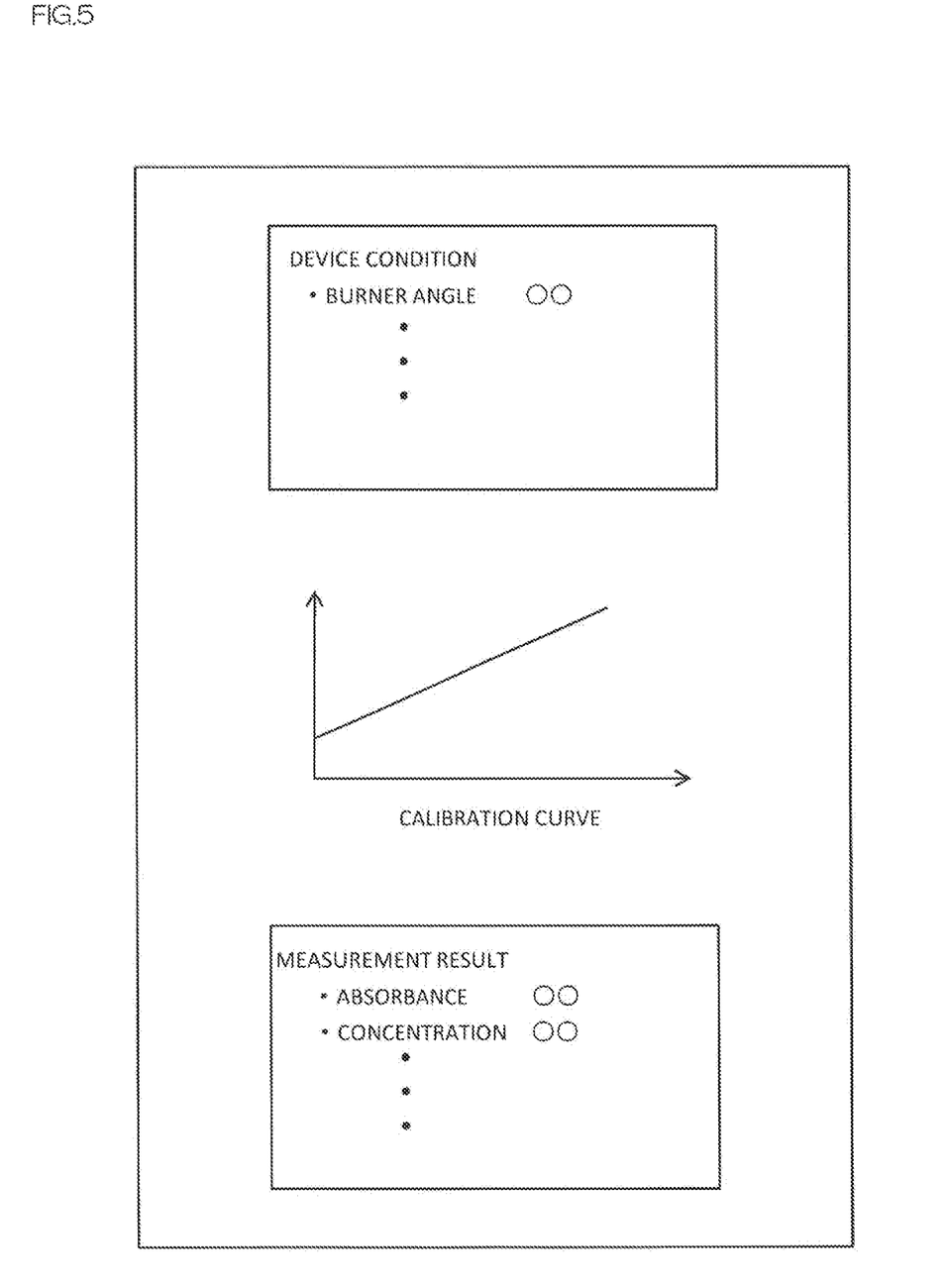
FIG. 5 is a diagram showing a specific example of report data output by a data output unit.

FIG. 5 is a diagram showing a specific example of report data output by the data output unit 154. The report data includes, in addition to the measurement result, a device condition at the time of the measurement, calibration curve data used at the time of the measurement, and the like.

The measurement result in the report data includes various pieces of data obtained by measuring the sample, such as, for example, the absorbance calculated based on the measurement data from the photometry unit 14, in addition to the concentration of the sample calculated by the sample concentration calculation unit 153. The calibration curve data in the report data is calibration curve data used when the concentration of the sample is calculated, and, for example, represents the relationship between the concentration of a component in the sample and the absorbance in a form of graph. The device conditions in the report data include, for example, the rotation position (burner angle) of the burner 121 at the time of measurement. This burner angle is equal to the rotation position of the burner 121 when the calibration curve data in the report data is obtained.

6. Action and Effect (1) In the present embodiment, the angle of the burner 121 can be manually adjusted by the grip portion 124. Further, since the rotation position of the burner 121 can be detected by the rotation position detection unit 125, the rotation position of the burner 121 can be easily obtained. Furthermore, a relationship between the rotation position of the burner 121 detected by the rotation position detection unit 125 and the measurement result can be associated, so that the traceability of the measurement result can be ensured.

(2) Further, in the present embodiment, the rotation position of the burner 121 can be detected discretely by the rotation position detection unit 125, and the relationship between each rotation position and the measurement result can be associated. Therefore, the traceability of the measurement result at each rotation position detected by the rotation position detection unit 125 can be ensured. The rotation position of the burner 121 other than the rotation position detected by the rotation position detection unit 125 can be associated with the measurement result using, for example, an interpolation method.

(4) In the present embodiment, the rotation position of the burner 121 is stored in the storage unit 18 as a device condition. Therefore, when the measurement result is checked, the rotation position of the burner 121 can be read from the storage unit 18 and checked as part of the device condition. Therefore, the traceability of the measurement result can be further improved.

(5) In particular, in the present embodiment, the rotation position of the burner 121 when the calibration curve data is obtained by measuring the known sample is stored in the storage unit 18 as the device condition in a manner associated with the calibration curve data. In this manner, the rotation position of the burner 121 when the calibration curve data is obtained can be read from the storage unit 18 and checked as part of the device condition, so that the traceability of the measurement result can be further improved.

(6) Furthermore, in the present embodiment, in a manner associated with the concentration of the sample calculated by the sample concentration calculation unit 153 and the calibration curve data used when the concentration of the sample is calculated, the rotation position of the burner 121 when the calibration curve data is obtained is stored in the storage unit 18 as the device condition. In this manner, when the concentration of the sample calculated based on the measurement data of the unknown sample and the calibration curve data is checked as the measurement result, the rotation position of the burner 121 when the calibration curve data used when the concentration of the sample is calculated is obtained can be read from the storage unit 18 and checked as part of the device condition.

(7) Further, in the present embodiment, the concentration of the sample calculated by the sample concentration calculation unit 153, the calibration curve data used when the concentration of the sample is calculated, and the device conditions including the rotation position of the burner 121 when the calibration curve data is obtained are output as the report data by the data output unit 154. In this manner, when the concentration of the sample calculated based on the measurement data of the unknown sample and the calibration curve data is checked as the measurement result on the report data, the calibration curve data used when the concentration of the sample is calculated and the rotation position of the burner 121 when the calibration curve data is obtained can be checked as part of the device conditions.

7. Variation

Figure 6A:
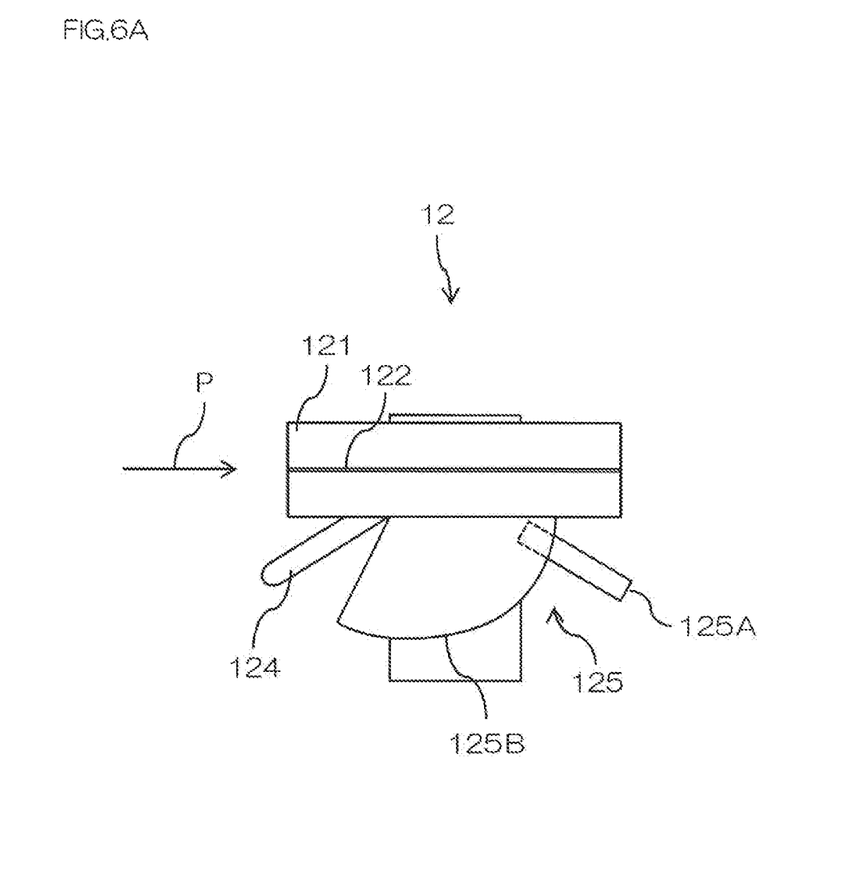
FIG. 6A is a plan view for explaining a variation of the rotation mechanism of the burner, and shows a state where the outlet of the burner is along the optical path of the measuring beam.
Figure 6B:
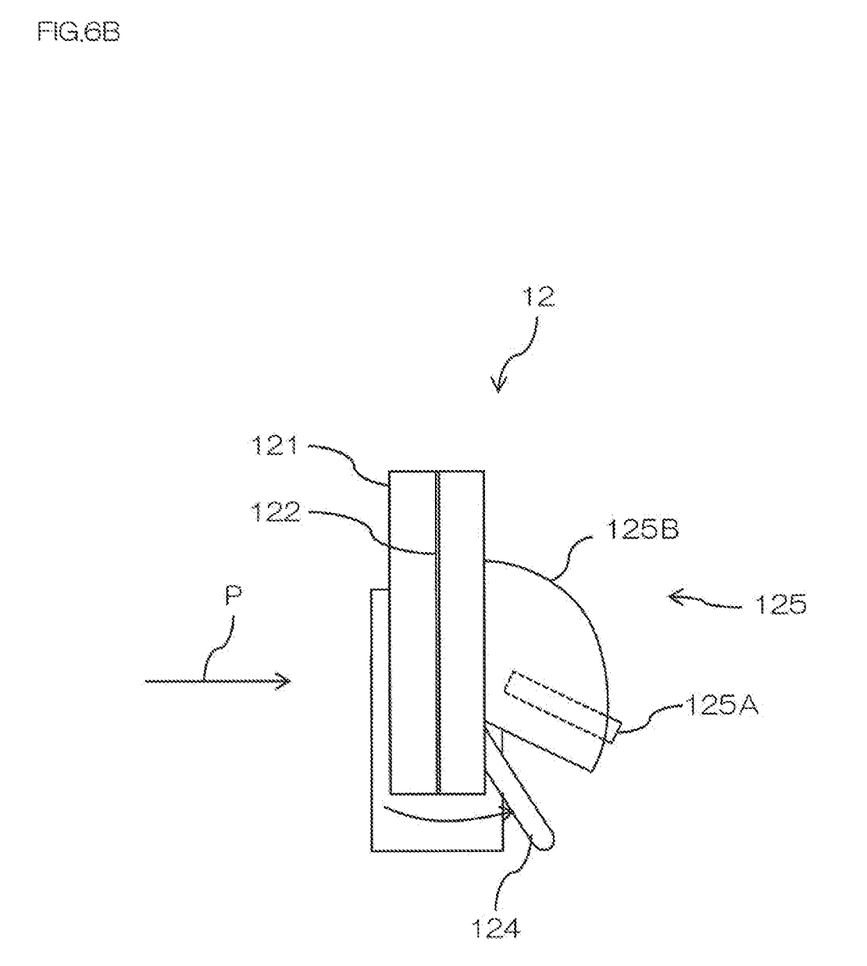
FIG. 6B is a plan view for explaining a variation of the rotation mechanism of the burner, and shows a state where the outlet of the burner is orthogonal to an optical path P of the measuring beam.

FIGS. 6A and 6B are plan views for explaining a variation of the rotation mechanism of the burner 121. FIG. 6A shows a state where the outlet 122 of the burner 121 is along the optical path P of the measuring beam. On the other hand, FIG. 6B shows a state where the outlet 122 of the burner 121 is orthogonal to the optical path P of the measuring beam.

In this example, the configuration of the rotation position detection unit 125 is different from that in the above embodiment. Specifically, the rotation position detection unit 125 in this example is configured to continuously detect the rotation position of the burner 121 instead of discretely detecting the rotation position as in the above embodiment. Since the configurations other than the rotation position detection unit 125 are similar to those of the above-described embodiment, the similar configurations are denoted by the same reference numerals and detailed description of the similar configurations will be omitted.

Only one of the optical sensor 125A is provided in contrast to the configuration in which a plurality of the optical sensors 125A are provided as in the above embodiment. The optical sensor 125 includes a light emitting unit and a light receiving unit as in the above embodiment, and outputs signals having different intensities according to a light receiving amount of the light receiving unit.

The light shielding unit 125B is provided in the burner 121 as in the above embodiment, and rotationally moves around the rotation shaft 123 as the burner 121 rotates. However, unlike the above embodiment, the light shielding unit 125B always shields light from the light emitting unit in the optical sensor 125. However, as shown in FIGS. 6A and 6B, an amount of light shielded by the light shielding unit 125B differs according to the rotation position of the burner 121. Therefore, the rotation position of the burner 121 can be continuously detected based on the light reception intensity at the light receiving unit of the optical sensor 125A that continuously changes as the burner 121 rotates.

In this manner, the rotation position of the burner 121 can be detected continuously, and the relationship between each of continuous rotation positions and the measurement result can be associated. Therefore, the traceability of the measurement result can be further improved.

However, the rotation position detection unit 125 that performs detection continuously is not limited to an optical sensor, and may be composed of other various sensors, such as a capacitive sensor.

In the above embodiment, the case where the manual rotation mechanism for manually rotating the burner 121 is composed of the rotation shaft 123 and the grip portion 124 is described. However, the manual rotation mechanism only needs to have a configuration in which the burner 121 can be manually rotated, and may have a configuration in which, for example, the grip portion 124 is not included.

Further, the configuration of the rotation position detection unit 125 is not limited to the configuration shown in the embodiment and the variation, and other various configurations can be employed.

DESCRIPTION OF REFERENCE SIGNS 1 atomic absorption spectrophotometer
2 flame
11 light source
12 atomization unit
13 detector
14 photometry unit
15 control unit
16 display unit
17 operation unit
18 storage unit
121 burner
122 outlet
123 rotation shaft
124 grip portion
125 rotation position detection unit
125A optical sensor
125B light shielding unit
151 storage processing unit
152 calibration curve generation unit
153 sample concentration calculation unit
154 data output unit

The invention claimed is:

1. A flame atomic absorption spectrophotometer, comprising:
   an atomization unit that atomizes a sample by burning mixed gas of fuel gas and supporting gas with a burner to form a flame, and spraying the sample into the flame;
   a light source that emits a measuring beam into the flame;
   a detector that detects a measuring beam that has passed through the flame;
   a manual rotation mechanism for manually rotating the burner to change an angle of the burner with respect to an optical path of the measuring beam;
   a rotation position detection unit that discretely detects a rotation position of the burner; and
   a storage unit that stores, in association with calibration curve data obtained by measuring a known sample, as a device condition, a rotation position of the burner when the calibration curve data is obtained.

2. The flame atomic absorption spectrophotometer according to claim 1, further comprising:
   a sample concentration calculation unit that calculates a concentration of a sample based on measurement data obtained by measuring an unknown sample and the calibration curve data obtained under a same condition as that at the time of the measurement, wherein
   in association with the concentration of the sample calculated by the sample concentration calculation unit and calibration curve data used when the concentration of the sample is calculated, the storage unit stores, as a device condition, a rotation position of the burner when the calibration curve data is obtained.

3. The flame atomic absorption spectrophotometer according to claim 2, further comprising:
   a data output unit that outputs, as report data, the concentration of the sample calculated by the sample concentration calculation unit, calibration curve data used when the concentration of the sample is calculated, and a device condition including a rotation position of the burner when the calibration curve data is obtained.

4. The flame atomic absorption spectrophotometer according to claim 1, wherein
   the rotation position detection unit includes an optical sensor that includes a light emitting unit and a light receiving unit.

5. The flame atomic absorption spectrophotometer according to claim 1, wherein
   the rotation position detection unit includes a plurality of optical sensors provided on a trajectory of a light shielding unit that moves as the burner rotates.

6. The flame atomic absorption spectrophotometer according to claim 5, wherein
   the plurality of optical sensors are disposed at equal intervals in a circumferential direction around a rotation shaft of the burner.

7. The flame atomic absorption spectrophotometer according to claim 1, wherein
   the rotation position detection unit transfers the rotation position to a computer processor, and
   the computer processor receives the rotation position from the rotation position detection unit, generates calibration curve data by measuring a known sample, and transfers the calibration curve data and a rotation position of the burner when the calibration curve data is generated to the storage unit.

* * * * *